United States Patent
Hintermeir (10) Patent No.: US 10,428,709 B2
(45) Date of Patent: Oct. 1, 2019

(54) METHOD FOR HEATING AN OPERATING AGENT, AS WELL AS RESERVOIR HEATING SYSTEM AND AN OPERATING AGENT HEATING SYSTEM

(71) Applicant: SIEMENS MOBILITY GMBH, Munich (DE)

(72) Inventor: Stefan Hintermeir, Aschau I. Ch (DE)

(73) Assignee: Siemens Mobility GmbH, Munich (DE)

( * ) Notice: Subject to any disclaimer, the term of this patent is extended or adjusted under 35 U.S.C. 154(b) by 163 days.

(21) Appl. No.: 15/531,512

(22) PCT Filed: Nov. 18, 2015

(86) PCT No.: PCT/EP2015/076922
§ 371 (c)(1),
(2) Date: May 30, 2017

(87) PCT Pub. No.: WO2016/083200
PCT Pub. Date: Jun. 2, 2016

(65) Prior Publication Data
US 2018/0252137 A1 Sep. 6, 2018

(30) Foreign Application Priority Data

Nov. 27, 2014 (DE) .......................... 10 2014 224 284

(51) Int. Cl.
*F01N 3/20* (2006.01)
*F02G 5/00* (2006.01)

(52) U.S. Cl.
CPC ............. *F01N 3/2066* (2013.01); *F02G 5/00* (2013.01); *F01N 2610/02* (2013.01);
(Continued)

(58) Field of Classification Search
CPC ............... F01N 3/2066; F01N 2610/02; F01N 2610/10; F01N 2610/1406;
(Continued)

(56) References Cited

U.S. PATENT DOCUMENTS

2007/0079599 A1 4/2007 Osaku et al.
2010/0242439 A1 9/2010 Domon et al.
(Continued)

FOREIGN PATENT DOCUMENTS

DE 19935920 A1 3/2001
DE 102008011329 A1 9/2009
(Continued)

OTHER PUBLICATIONS

Machine Translation of DE-102011015196-A1 (Sep. 2012).*

*Primary Examiner* — Brandon D Lee
(74) *Attorney, Agent, or Firm* — Laurence Greenberg; Werner Stemer; Ralph Locher (57) ABSTRACT

A method for heating an operating agent for a rail vehicle, particularly for heating a reducing agent for the aftertreatment of exhaust gas. A coolant liquid is pumped through a cooling circuit of the internal combustion engine by a pump when the operating agent heating system is in an operating mode and, also in the operating mode, the coolant liquid can be pumped through a main heating circuit by the pump in order to heat the operating agent in a reservoir. In a preheating mode, the main heating circuit for the operating agent is uncoupled in a substantially fluid-mechanical manner from the cooling circuit of the internal combustion engine. The cooling circuit functions as a first sub-circuit of a preheating circuit and the uncoupled main heating circuit functions as a section of a second sub-circuit of the preheating circuit.

19 Claims, 5 Drawing Sheets

(52) U.S. Cl.
CPC .. *F01N 2610/10* (2013.01); *F01N 2610/1406* (2013.01); *F01N 2610/1433* (2013.01); *F01N 2900/1818* (2013.01); *Y02T 10/166* (2013.01)

(58) Field of Classification Search
CPC ..... F01N 2610/1433; F01N 2900/1818; F02G 5/00; Y02T 10/166
See application file for complete search history.

(56) References Cited

U.S. PATENT DOCUMENTS

| | | |
|---|---|---|
| 2011/0088587 A1 | 4/2011 | Willbrandt et al. |
| 2012/0031082 A1* | 2/2012 | Gismervik ............ F01N 3/2066 60/295 |

FOREIGN PATENT DOCUMENTS

| | | | |
|---|---|---|---|
| DE | 102011015196 A1 * | 9/2012 | ........... F01N 3/2066 |
| DE | 102011015196 A1 | 9/2012 | |
| EP | 1662103 A1 | 5/2006 | |
| EP | 1731882 A1 | 12/2006 | |
| EP | 1757781 A1 | 2/2007 | |
| EP | 2175111 A1 | 4/2010 | |
| EP | 2226479 A1 | 9/2010 | |
| WO | 2010069924 A2 | 6/2010 | |
| WO | 2010110669 A1 | 9/2010 | |

* cited by examiner

METHOD FOR HEATING AN OPERATING AGENT, AS WELL AS RESERVOIR HEATING SYSTEM AND AN OPERATING AGENT HEATING SYSTEM

BACKGROUND OF THE INVENTION

Field of the Invention

The invention relates to a method for heating an operating agent for a rail vehicle, particularly for heating a reducing agent for the aftertreatment of exhaust gas. The invention further relates to a reservoir heating system and/or to an operating agent heating system for a rail vehicle, particularly for heating a reducing agent for the aftertreatment of exhaust gas. The invention further relates to a drive, in particular a diesel drive, for a rail vehicle or motor vehicle or to a rail or motor vehicle. This document claims the priority of the German patent application DE 10 2014 224 284 A1. (Nov. 27, 2014), the disclosure contents of which are hereby included by reference thereto.

The exhaust gas limit values for vehicles, particularly for rail vehicles and motor vehicles, are being continually tightened. In some cases the newest exhaust gas limit values will only be achieved with an SCR (Selective Catalytic Reduction) system for selective catalytic reduction of nitrogen oxides in exhaust gases of internal combustion engines, which operates with a urea solution, which must also be carried on the vehicle. Current urea solutions have the property that, depending on the urea content, they can freeze from around −10°. Correct operation of the vehicle is then no longer possible. The exhaust gas limit values can no longer be adhered to when the urea solution is frozen. A frozen urea solution is not destroyed and can be used again after a thawing process.

For this reason it can be necessary to integrate a heating or warming concept into a reservoir for the urea solution. In such cases both different operating states of the vehicle and also different ambient temperatures must be investigated. Furthermore it should be insured that urea solutions are not allowed to exceed a specific maximum temperature of around +60°. This means that the heating concept requires an open-loop or closed-loop temperature control, so that both a minimum temperature and also a maximum temperature of the urea solution will not be exceeded.

With a rail vehicle in particular, with a diesel locomotive for example, this leads to the following problem. When the internal combustion engine of the rail vehicle is running, the on-board network of the rail vehicle is completely activated and all open-loop control, closed-loop control and/or monitoring circuits of the rail vehicle are active. In this operating state a heating of a urea container of the rail vehicle can be monitored. If however one also wishes to supply heat to the urea container in a preheating mode, open-loop or closed-loop control of the temperature via an on-board network is not possible, because the on-board network and all open-loop control, closed-loop control and/or monitoring circuits are switched off in the preheating mode of the rail vehicle.

SCR exhaust gas systems are known in trucks. With a truck too a reservoir of a urea solution (mostly AdBlue®) will be heated by a coolant liquid of the truck, which however, as has been explained above, is only active during operation of the truck. Since with a truck the amount of urea solution stored is considerably smaller than with a comparatively large rail vehicle, in the event of the urea solution being frozen, the urea solution can quickly be thawed out again.

DE 199 35 920 A1 discloses an apparatus and a method for heating a reservoir for urea solution of an aftertreatment of exhaust gas system of an internal combustion engine for a commercial vehicle. The urea solution stored in the reservoir is able to be heated by the waste heat of the internal combustion engine, wherein a coolant liquid of the internal combustion engine will be carried through heating tubes in the reservoir. A comparatively large volume of urea solution is able to be thawed out here in relation to the size of the reservoir. A heat exchanger and thermostat valves are provided to limit the temperature of the urea solution.

EP 2 226 479 A1 teaches an electric heating device with a plurality of heating elements for a reservoir of a urea solution for an aftertreatment of exhaust gas system of an internal combustion engine of a motor vehicle as well as a method for melting a urea solution frozen in the reservoir. In order to melt a volume of the urea solution there is provision for the heating device to have a control unit, through which electrical heating elements are able to be operated individually or in groups in turn for melting the volume.

In a larger internal combustion engine, which is of an order of magnitude between an internal combustion engine for a truck and an internal combustion engine for a rail vehicle, a similar process will be applied. As soon as the internal combustion engine is switched on, an open-loop or closed-loop control system within the internal combustion engine takes over a supply of cooling water into the reservoir of the urea solution. Should the temperature of the urea solution fall below a threshold value, then this valve opens and coolant liquid from the internal combustion engine flows through the reservoir to heat the urea solution. When an upper threshold value temperature is reached this valve closes again.

DE 10 2008 011 329 A1 discloses a rail vehicle with an internal combustion engine and an SCR exhaust gas system connected to the internal combustion engine. The SCR exhaust gas system system comprises a supply device for a urea solution, which is embodied to supply the urea solution to a flow of exhaust gas of the internal combustion engine. For this purpose the supply device has a reservoir for the urea solution. The supply device can further include a temperature-control device for cooling and/or heating the urea solution. For heating the urea solution the temperature control device can include an electrically-operated heating line and/or a heating line fed from a coolant circuit of the internal combustion engine.

The following further concept exists for internal combustion engines of diesel locomotives. A comparatively small element heated by coolant water will be employed in a suction region of a urea solution. This element is however connected into the coolant water circuit such that nothing flows through it during a preheating and thus the urea solution will also not be heated. If the urea solution is frozen over a large surface area in the reservoir, then this element heated by coolant water, once the internal combustion engine is switched on, needs a comparatively long time before the frozen urea solution becomes fully liquid. For this reason, with this concept an additional electrical heating mat will be integrated into the reservoir, which only supports a thawing of the urea solution when the internal combustion engine is switched on however.

SUMMARY OF THE INVENTION

An object of the invention is to specify an improved method for heating an operating agent for a rail vehicle, particularly for heating a reducing agent for aftertreatment of exhaust gas, and also an operating agent heating system for a rail vehicle, particularly for heating a reducing agent for aftertreatment of exhaust gas. The operating agent should always be available to the rail vehicle in a sufficient quantity here, apart from in an emergency situation, i.e. even when the vehicle is being started in outside temperatures of below around −10°. A further object of the invention is to provide a drive, in particular a diesel drive, for a rail vehicle or motor vehicle and to provide a rail vehicle or motor vehicle.

The object of the invention is achieved by means of a method for heating an operating agent for a rail vehicle, particularly for heating a reducing agent for aftertreatment of exhaust gas; by means of a reservoir heating system for a rail vehicle, particularly for heating a reducing agent for aftertreatment of exhaust gas; by means of an operating agent heating system for a rail vehicle, particularly for heating a reducing agent for aftertreatment of exhaust gas; and by means of a drive, in particular a diesel drive, for a rail vehicle or motor vehicle, or by a rail or motor vehicle in accordance with the independent claims. Advantageous developments, additional features and/or advantages of the invention emerge from the dependent claims and/or from the description of the invention given below.

In the inventive method, in one operating mode of an operating agent heating system, a coolant liquid will be pumped by a pump through a coolant circuit of the internal combustion engine, wherein further in this operating mode the coolant liquid can be pumped by this pump through a main heating circuit for heating the operating agent in a reservoir. For a preheating mode of the operating agent heating system the main heating circuit of the operating agent can be essentially fluid-mechanically uncoupled from the coolant circuit of the internal combustion engine, wherein the coolant circuit functions as a first sub-circuit of a preheating circuit and the uncoupled main heating circuit functions as a section of a second sub-circuit of the preheating circuit.

In accordance with the invention the coolant liquid preferably heated by a preheating device in the preheating circuit can be pumped by a pump in a preheating circuit or a pump of the preheating device through the preheating circuit. In the thawing mode the coolant liquid can preferably flow essentially in parallel in the coolant circuit of the internal combustion engine or in the first sub-circuit of the preheating circuit, and/or the coolant liquid can circulate in the second sub-circuit of the preheating circuit.

The inventive reservoir heating system has a reservoir for an operating agent, a suction opening in the reservoir for sucking in the operating agent and a heating device in the reservoir for heating the operating agent, wherein the heating device has two sections, and in relation to a floor of the reservoir, a first section of the heating device is arranged essentially at right angles to the floor and a second section of the heating device is arranged in parallel to it, and the two sections of the heating device, through which a coolant liquid of the rail vehicle is able to flow, are connected fluid-mechanically in parallel or in series. The first section of the heating device can extend up to or above a maximum fill level of the operating agent. The second section of the heating device can be accommodated close to the floor in the reservoir, wherein preferably a gap is provided between the second section of the heating device and the floor.

In accordance with the invention the operating agent can be a reducing agent, preferably a urea solution for aftertreatment of exhaust gas. Furthermore a suction connector in the reservoir or the reservoir can feature the suction opening. In addition the suction opening can be provided in an area of the reservoir that is adjacent to both sections of the heating device. The first section of the heating device can essentially be embodied in the shape of a tube or a cylinder and the second section of the heating device can essentially be embodied in the shape of a cushion or a cube. The two sections can constitute a single heating device, or two sections separate from one another can embody one heating device arrangement.

The inventive operating agent heating system comprises a coolant circuit for an internal combustion engine and a main heating circuit connected to the coolant circuit for heating an operating agent in a reservoir, wherein a coolant liquid able to be circulated through the main heating circuit is able to be pumped by means of a pump of the coolant circuit through the main heating circuit in one operating mode of the operating agent heating system, wherein the main heating circuit, by bypassing its inflow line, is able to be bridged over by a preheating line. The main heating circuit can be connected to the coolant circuit by means of an inflow line downstream of the pump and by means of an outflow line upstream of the pump. Furthermore the main heating circuit, especially the inflow line, can have a valve, by means of which, on the basis of a temperature of the operating agent, a flow of coolant liquid through the main heating circuit is able to be set.

In accordance with the invention the main heating circuit can have at least one heating device in the reservoir, by means of which a column or a cushion of the operating agent close to the floor is able to be heated or thawed. A suction region of the operating agent in the reservoir or a suction opening can be able to be heated or thawed by means of an additional heating device. The preheating line is on the one hand preferably connected to the main heating circuit downstream of the heating device and on the other hand is preferably connected to the coolant circuit is upstream of the cylinders.

In forms of embodiment of the invention a preheating device can be provided on/in the preheating line downstream of the heating device and a non-return valve can be provided downstream of the heating device. Furthermore an intermediate line can be connected to the preheating line downstream of the heating device and upstream of the non-return valve, which is also connected to the main heating circuit. Over and above this the coolant circuit and the main heating circuit are able to be switched over by means of the preheating line and the intermediate line into a preheating circuit, by means of which the internal combustion engine and/or the operating agent in the reservoir is or are able to be preheated.

In accordance with the invention the preheating circuit can have two sub-circuits, wherein in a preheating mode of the operating agent heating system, the coolant liquid is able to flow through the two sub-circuits. In a first sub-circuit of the preheating circuit the coolant liquid is able to flow essentially in parallel through the coolant circuit. In a second sub-circuit of the preheating circuit the coolant liquid is essentially full circulatable. In the preheating mode the coolant liquid is able to be pumped through the two sub-circuits by a pump in the preheating line and/or a pump of the preheating device.

The inventive operating agent heating system can be embodied such that, for a switch from preheating mode into operating mode and vice versa, there is no reversal of a direction of circulation through lines of the main heating circuit. In accordance with the invention the pump can be embodied as a pump driven by the internal combustion engine or as an electrically-operated pump. Furthermore the valve can be embodied as a motorized valve. The valve can be provided upstream of the heating device in the main heating circuit, especially on/in the inflow line. The preheating device can also be embodied as a preheating device driven by the internal combustion engine or as an electrical preheating device. Above and beyond this a non-return valve can be provided on/in the intermediate line upstream of the heating device. In preheating mode the internal combustion engine and/or the pump is preferably inactive and/or a pump can be provided in the preheating line upstream or downstream of the preheating device.

The invention is explained in greater detail below on the basis of exemplary embodiments of a form of embodiment of a variant, which refers to the enclosed drawing. Elements, modules or components that possess an identical, univocal or similar embodiment and/or function, are provided with the same reference characters in the description of the figures, the list of reference characters and the claims, and/or are identified in the figures by the same reference characters. Possible alternatives, static and/or kinematic variations, combinations etc. to the form of embodiment shown and/or to the explained exemplary embodiments of the invention or individual modules, parts or sections thereof that are not explained in the description, not shown in the drawings and/or not conclusive, can be taken from the list of reference characters.

All explained features, including those of the list of reference characters, are able to be used not only in the specified combination or in the specified combinations, but also in another combination or in other combinations or on their own. In particular it is possible, on the basis of the reference character and the features in the description of the invention, the figure description and/or the list of reference characters assigned to said character, to replace a feature or a plurality of features in the description of the invention and/or the figure description. Furthermore this enables a feature or a plurality of features in the claims to be interpreted, specified in greater detail and/or substituted. In the figures (FIG.) of the drawing:

DESCRIPTION OF THE INVENTION

The invention is explained in greater detail below on the basis of exemplary embodiments of a variant (cf. FIGS. 1 to 4) of a method for heating an operating agent 302 and of an operating agent heating system 3 (FIGS. 1 to 4) and of a reservoir heating system 50 (FIG. 4) for a vehicle drive 1 of a rail vehicle. However the invention is not restricted to such a variant and/or to the forms of embodiment described below, but is of a more basic nature, so that it can be applied to all drives 1 within the meaning of the invention, e.g. to motor vehicles as well. Although the invention is described in greater detail and illustrated by preferred exemplary embodiments, the invention is not restricted by these disclosed examples. Other variations can be derived herefrom without departing from the scope of protection of the invention.

Figure 1:
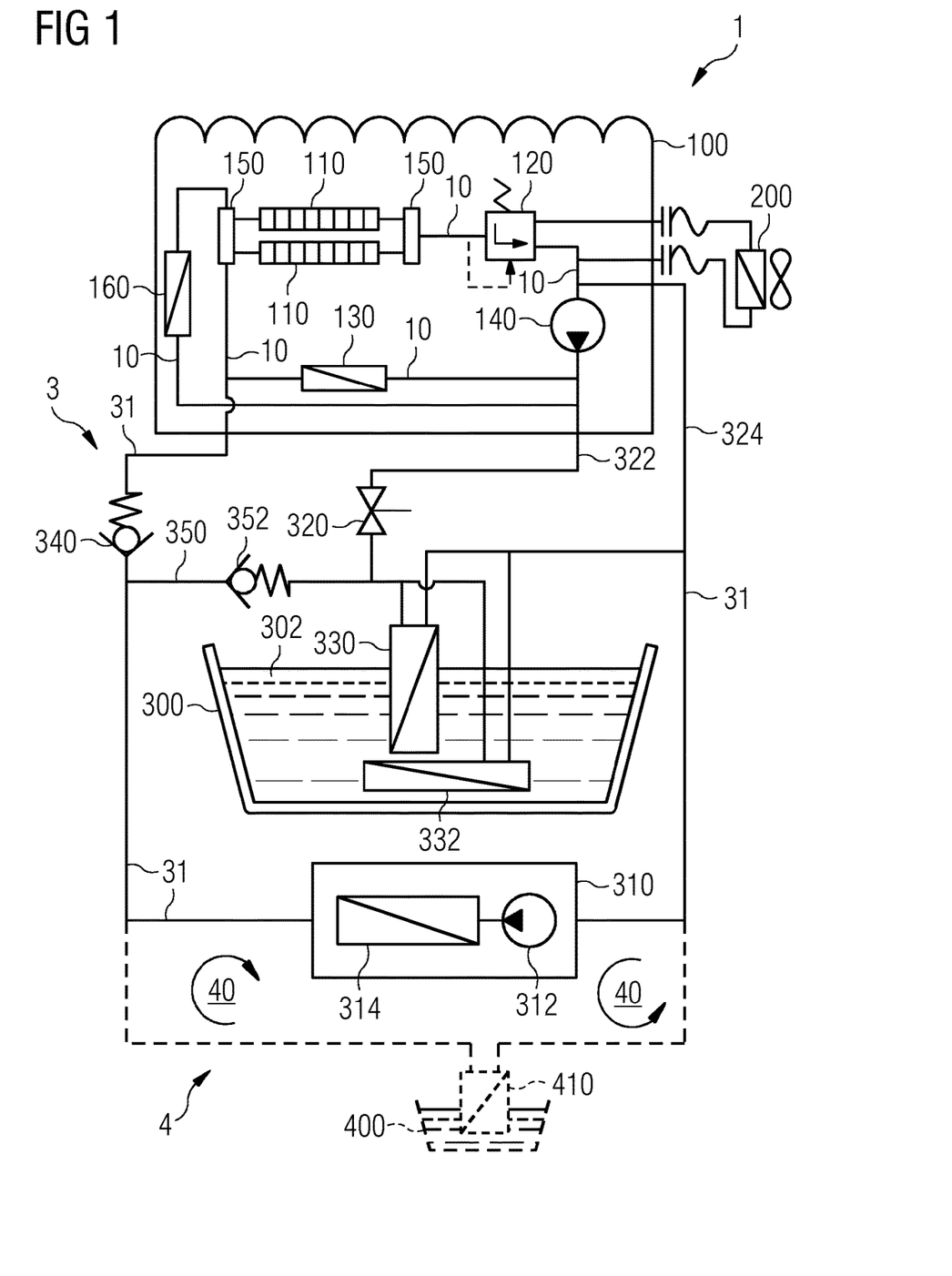
FIG. 1 shows a schematic view of a vehicle drive for a rail vehicle with an inventive operating agent heating system, when the vehicle is shut down.
Figure 2:
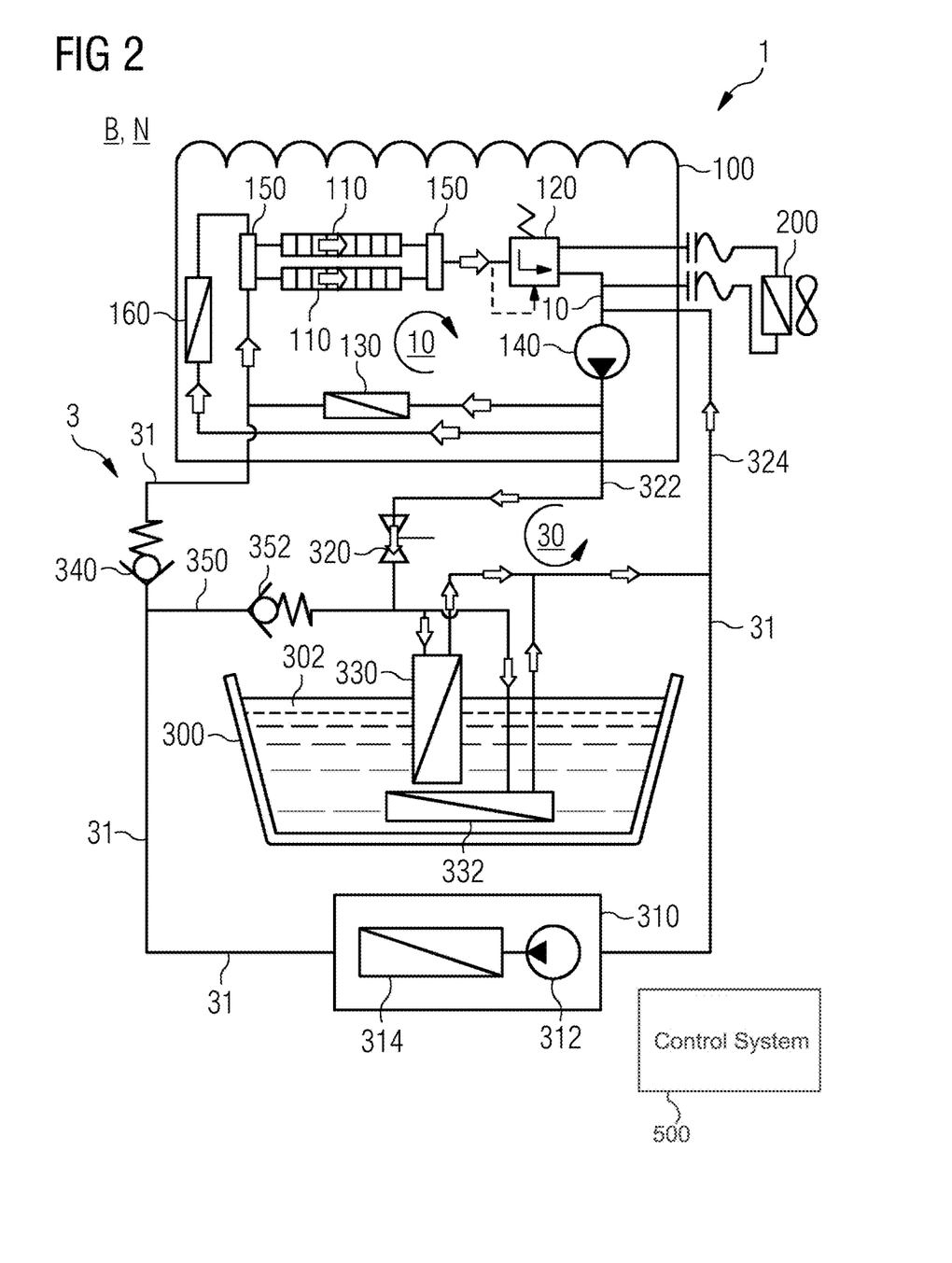
FIG. 2 shows a schematic view of the vehicle drive from FIG. 1, wherein an operating mode and an emergency start mode of the rail vehicle are shown.

FIG. 2 shows a known active or configured coolant circuit 10 (arrows) of an internal combustion engine 100, in particular of a diesel engine 100, of the vehicle drive 1 of the rail vehicle, with e.g. the standard components of a plurality of cylinders 110 to be cooled, a thermostat 120, an oil cooler 130, an engine pump 140, collecting tank 150, an intercooler 160 etc. The fluid lines or a line system for a coolant liquid of the coolant circuit 10, preferably a water-glycol mixture, lead in this case through the internal combustion engine 100 and past its cylinders 110. In addition FIG. 1, which shows the operating agent heating system 3 in a shut-down state, and FIG. 2, show an external cooler 200, through which the coolant liquid, in particular in a warmed-up operating state of the internal combustion engine 100 or of the vehicle drive 1, is able to be conveyed, so that said liquid can emit its heat taken up in the internal combustion engine 100 to the surroundings.

FIG. 2 further shows an inventively active or configured main heating circuit 30 (arrows) of the operating agent heating system 3 for a reservoir 300 of an operating agent 302, particularly of a reducing agent 302 for a system for aftertreatment of exhaust gas, of the rail vehicle. Preferably the reducing agent 302 is a urea solution 302. The fluid lines or a line system of the main heating circuit 30 in this case is or are preferably connected to the coolant circuit 10 (inflow line 322 and outflow line 324) and can establish a connection to said circuit in a preferably direct fluid-mechanical connection. I.e. when the conditions in the reservoir 300 require this, the coolant liquid can flow through the main heating circuit 30 as a heating medium for the operating agent 302 in the reservoir 300. I.e. the main heating circuit 30 enables waste heat of the internal combustion engine 100 to be used for heating the operating agent 302.

The main heating circuit 30 for the reservoir 300, in addition to the fluid lines, features e.g. the preferably heat-insulated reservoir 300 for the operating agent 302, in particular the urea solution 302, a preferably motorized valve 320, a heating device 330 preferably embodied as a multifunction unit 330 and possibly an (additional) heating device 332 in the reservoir 300. If need be, this scheme can be expanded with an additional heating circuit 40 of an additional heater 4 for a further fluid or for a further operating agent, e.g. a fuel, for the rail vehicle (cf. FIG. 1). I.e. the additional heating circuit 40 can be connected to the main heating circuit 30, to a preheating circuit 32; 32.1, 32.2 (see below), which is able to be connected fluid-mechanically to this circuit or these circuits by means of faucets or valves that can be actuated manually or automatically. Naturally a number of additional heating circuits 40 can also be provided.

Figure 3:
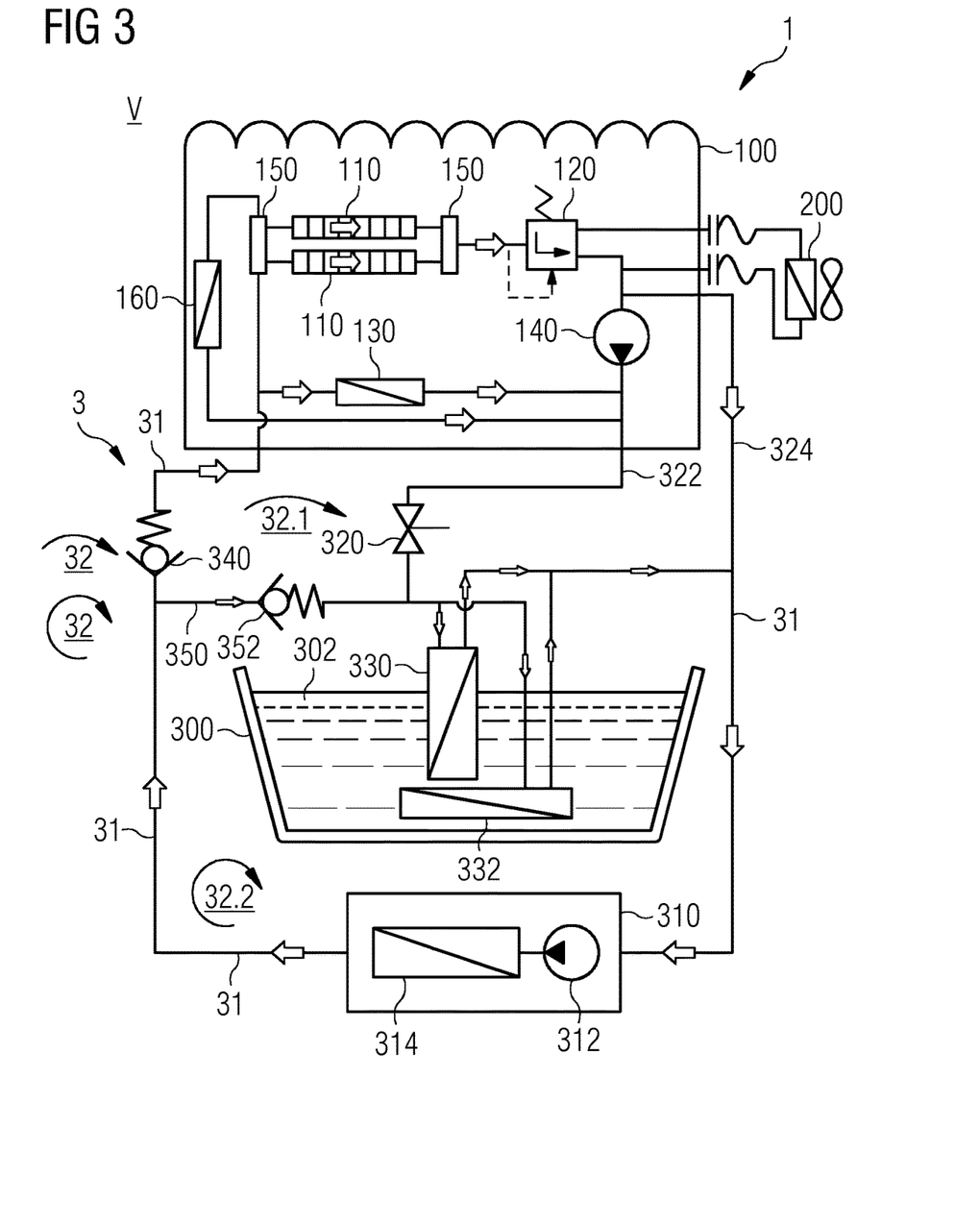
FIG. 3 shows a schematic view of the vehicle drive from FIG. 1, wherein a preheating mode of an internal combustion engine and of a reservoir of the rail vehicle are shown.

FIG. 3 shows an inventively active or configured preheating circuit 32 (arrows) of the operating agent heating system 3 for the reservoir 300 or the operating agent 302. The fluid line(s) or a line system, referred to below as the preheating line 31, for realizing the preheating circuit 32, is preferably connected to the main heating circuit 30 downstream of the heating device 330, 332 and leads via a preheating device 310 (pump 312 and heating element 314 of the preheating device 310), a non-return valve 340 to the coolant circuit 10, where the preheating line 31 is preferably connected downstream of the oil cooler 130.

The preheating circuit 32 can be brought into a preferably direct fluid-mechanical connection with lines of the main heating circuit 30 and the coolant circuit 10, wherein the preheating circuit 32 divides the main heating circuit 30 and the coolant circuit 10, while bypassing an inflow line 322 for the main heating circuit 30, such that said circuit leads through the internal combustion engine 100 (first sub-circuit 32.1) and/or through the reservoir 300 (second sub-circuit 32.2). Here the preheating circuit 32 bridges over the inflow line 322 with the valve 320 located thereon or therein, so that the valve 320 has no effect. The inflow of the coolant liquid to the heating element or elements 330, 332 occurs starting from downstream of the heating element or elements 330, 332 via the preheating line 31 (preheating device 310) and a non-return valve 352 on or in an intermediate line 350.

So that coolant liquid also flows through the reservoir 300 or the heating device(s) 330, 332, the intermediate line 350 is connected to the preheating line 31, which makes a fluid communication between the preheating line 31 and the heating device or heating devices 330, 332 possible. Downstream of this connection the preheating line 31 has the non-return valve 340 opening in the direction of flow of the second sub-circuit 32.2, which can already be counted as part of the first sub-circuit 32.1.

Furthermore the intermediate line 350, downstream of its connection to the preheating line 31, likewise preferably has the non-return valve 352 opening in the direction of flow of the second sub-circuit 32.2. I.e. the intermediate line 350 connects the preheating circuit 32 of the internal combustion engine 100 to the main heating circuit 30 of the reservoir 300, while bridging over the inflow line 322. In accordance with the invention, through the preheating circuit 32, the coolant liquid can serve as a heating medium for the internal combustion engine 100 and/or the operating agent 302 in the reservoir 300, when the conditions in the internal combustion engine 100 and/or the reservoir 300 require this.

A heat not generated by the internal combustion engine 100 will be used by means of the preheating circuit 32 for heating the internal combustion engine 100 and/or the operating agent 302 (preheating device 310 in the preheating line 31). In forms of embodiment of the invention just the internal combustion engine 100 or just the operating agent 302 can be heated by the preheating circuit 32, which depends on the one hand on a strength of the non-return valves 340, 352 and on the other hand on a fluid pressure in the preheating line 31 at the connection of the intermediate line 350. Here the other sub-circuit 32.1/32.2 of the preheating circuit 32 is inactive in each case. Naturally, as shown in FIG. 3, it is possible for both the internal combustion engine 100 and also the operating agent 32 to be heated by the preheating circuit 32, wherein both sub-circuits 32.1, 32.2 of the preheating circuit 32 (arrows) are active. In the first sub-circuit 32.1 liquid flows essentially in parallel through the internal combustion engine 100.

In accordance with the invention the second sub-circuit 32.2 can also serve as a thawing circuit of the operating agent heating system 3 for the reservoir 300 or for the operating agent 302, if the operating agent 302 is frozen in the reservoir 300. Here too heat not generated by the internal combustion engine 100 will be used to thaw and heat the operating agent 302 (preheating device 310). The schemes depicted in FIGS. 1 to 3 cover the following operating cases of the rail vehicle, the vehicle drive 1 or the internal combustion engine 100: Shut down (FIG. 1), internal combustion engine 100 running or vehicle drive 1 running, or emergency start (switching on the internal combustion engine 100 when it may possibly be cold) of the rail vehicle (operating mode B, emergency start mode N, FIG. 2) and a preheating mode of operation of the internal combustion engine or of the vehicle drive 1 and/or of the reservoir 300 (preheating mode V, FIG. 3).

The operating mode B shown in FIG. 2 is only active with a running or a sufficiently hot or operationally-hot internal combustion engine 100, wherein the engine pump 140 is active. Here the coolant liquid circulates on the one hand in the internal combustion engine 100 through the cylinders 110, the collecting tank 150, the thermostat 120, the cooler 200, the engine pump 140, the oil cooler 130, the intercooler 160 and the collecting tank 150 (preferably in this order), i.e. in the coolant circuit 10. No coolant liquid flows into the preheating device 310, because in this case the non-return valves 340, 352 are kept closed. An open-loop control and/or closed-loop control of the rail vehicle is activated and the motorized valve 320 controls or regulates the temperature of the operating agent 302 in the reservoir 300 and prevents the operating agent 302 from overheating.

For heating the operating agent 302 the coolant liquid flows in this operating case in the main heating circuit 30 from the engine pump 140 via the motorized valve 320, the heating device 330 preferably embodied as a multifunctional unit 330 and preferably the (additional) heating device 332 arranged close to the floor, back to the engine pump 140. Here the main heating circuit 30 is preferably connected fluid-mechanically downstream and upstream of the engine pump 140 to the coolant circuit 10. Should the temperature of the operating agent 302 in the reservoir 300 fall below a threshold value, this will be diagnosed by an open-loop control or a closed-loop control of the internal combustion engine 100 and the motorized valve 320 preferably opens at intervals. Should the temperature of the operating agent 302 be above the threshold value, the motorized valve 320 preferably remains constantly closed. A regulation of the temperature in the reservoir 300 will be taken over by an open-loop and/or closed-loop control system 500 of the rail vehicle or of the internal combustion engine 100.

In the preheating mode V depicted in FIG. 3 only a pump 312 of the preheating device 310 is running. The internal combustion engine 100 and its engine pump 140 are switched off in preheating mode V. The basis for this operating state is that a temperature of the coolant liquid lies below a starting threshold for the internal combustion engine 100. In this operating state the coolant liquid flows both through the internal combustion engine 100 and also through the reservoir 300 or through the operating agent 302 located therein. The operating agent 302 in the reservoir 300 will preferably always be heated when the preheating mode V is active. A main volume flow (comparatively thick arrow) of the coolant liquid will be used for preheating the internal combustion engine 100. The preheating of the internal combustion engine 100 has priority over a heating of the operating agent 302.

During the operating state preheating mode V almost all open-loop control, closed-loop control and monitoring circuits of the rail vehicle are switched off. Thus the motorized valve 320 cannot take over an open-loop control or closed-loop control of the temperature of the operating agent 302, it remains closed. Despite this, overheating of the operating agent 302 is not possible, because the preheating device 310 possesses an internal temperature control or regulation, which controls or regulates the temperature of the coolant liquid between the temperature thresholds for starting the internal combustion engine 100.

The upper temperature threshold for starting the internal combustion engine 100 is below the temperature at which the operating agent 302 would sustain damage. Freezing of the operating agent 302 is likewise excluded, since at low external temperatures the internal combustion engine 100 likewise cools down and thus the temperature of the coolant liquid falls below the starting temperature of the internal combustion engine 100, which results in an automatic switching on of the preheating device 310.

To heat the internal combustion engine 100, the coolant liquid flows from the pump 312 of the preheating device 310 through the heating element 314 of the preheating device 310, the non-return valve 340 and the internal combustion engine 100 back to the pump 312 of the preheating device 310 (first sub-circuit 32.1 of the preheating circuit 32: 32.1, 32.2). To heat the operating agent 302, the coolant liquid flows from the pump 312 of the preheating device 310 through the heating element 314 of the preheating device 310, the intermediate line 350, the non-return valve 352, the heating device 330 and if necessary through the (additional) heating device 332 back to the pump 312 of the preheating device 310 (second sub-circuit 32.2 of the preheating circuit 32: 32.1, 32.2).

Should the rail vehicle be left for a long period in an environment with low temperatures, the operating agent 302 in the reservoir 300 can freeze partly or completely. If the operating agent 302 is urea solution 302 for example, then this is not damaged in such a case and only has to be thawed out for putting the rail vehicle into service. Since in such a situation the internal combustion engine 100 is cooled down, this must also be heated first of all to a starting temperature. I.e. in the case of a frozen operating agent 302 first of all the preheating mode V will be activated. As already explained above, in the preheating mode V, the majority of the coolant liquid flows through the internal combustion engine 100 and heats the latter. A smaller volume flow flows in the preheating mode V through the reservoir 300 and thaws the operating agent 302.

The aim in this case is not to thaw as large a volume of the operating agent 302 as possible, but explicitly at least only around a suction opening 372, e.g. of a suction connector 370 for the operating agent 302 in the reservoir 300. Preferably a suction region 301 of the operating agent 302 in the reservoir 300 will primarily be heated (cf. FIG. 4). This will be realized by the heating device 330 of the preferably multifunctional suction apparatus, i.e. the multifunctional unit 330 and if necessary by the (additional) heating device 332 around the suction connector 370. As a result of this preferably double heating it can be safely assumed that the operating agent 302 will be liquefied in the suction region 301.

Figure 4:
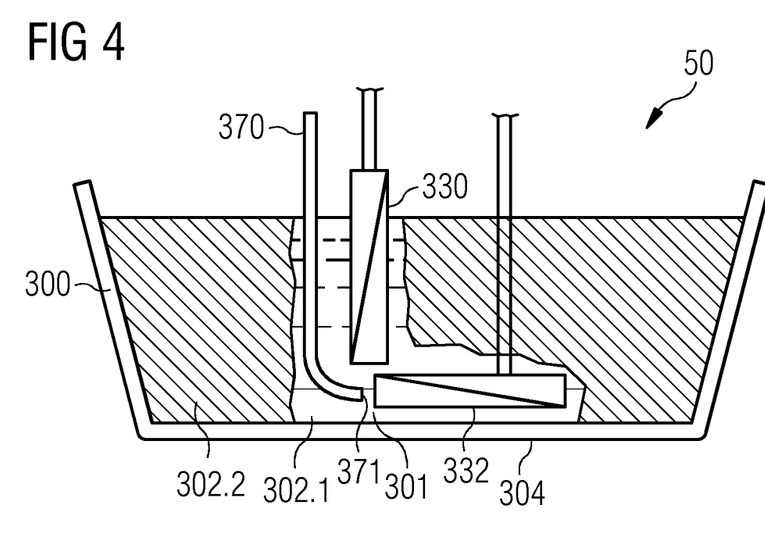
FIG. 4 shows a schematic view of a cutaway reservoir to clarify a position of a suction opening for sucking in an operating agent within the reservoir relative to a heating device.

FIG. 4 shows an inventive reservoir heating system 50 with a reservoir 300, the suction opening 372 and the heating device 330, 332. The heating device 330, 332 comprises two sections 330, 332, wherein one section 330 is primarily or essentially arranged vertically and the other section 332 is primarily or essentially arranged horizontally. A horizontal extent should in this case essentially lie in parallel to a floor 304 of the reservoir 300. I.e. the two sections make an angle of preferably 45° to 135°, especially an angle of 90°±20° with one another.

The suction opening 372 in this case is provided in the vicinity of the heating device 330, 332 such that the suction opening 372 is provided adjacent to one end or to one end section of the sections 330, 332 of the heating device 330, 332 in each case, preferably directly adjacent to said sections. There can principally be any given form of the sections 330, 332, but it is preferred for the first section 330 rather to be embodied as a longitudinal section and for the second section 330 rather to be embodied as a planar section. In accordance with the invention the two sections 330, 332 can form a single heating device or two heating devices 330, 332. If two heating devices 330, 332 are provided then one section is embodied as a heating device 330 and the other section 332 as an (additional) heating device 332.

One heating element of the heating device 330 is preferably arranged vertically in the vicinity of the suction connector 370. It thus thaws a vertical liquid cylinder (liquid operating agent 302.1) in a frozen operating agent 302.2, which can readily be seen in FIG. 4. The (additional) heating device 332 of the reservoir 300 preferably close to the floor thaws the frozen operating agent 302.2 from an underside. Above all with a smaller volume of the operating agent 302 in the reservoir 300 more heat will be introduced into the frozen operating agent 302.2 by the (additional) heating device 332 close to the floor.

In this arrangement of the heating devices 330, 332 a liquid cushion arises around the suction opening 372 located at the bottom of the reservoir 300 in the floor area ((additional) heating device 332) of the reservoir 300 and a liquid cylinder arises along the heating device 330.

At least sufficient suction conditions are thus provided, because the (additional) heating device 332 close to the floor builds up a planar liquid cushion and the vertical liquid cylinder around the heating device 330 represents a liquid column, which places the liquid cushion lying at the bottom of the reservoir under pressure and is in fluid communication with it. It is therefore further guaranteed that the liquid cushion lying at the bottom is always in contact with frozen operating agent 302.2, whereby a continuous heat transfer between these two layers is insured.

If the coolant liquid has reached the starting temperature of the internal combustion engine 100, then the internal combustion engine 100 will be started and the operating mode B of the running internal combustion engine 100 occurs (FIG. 2). The thawing of the frozen operating agent 302.2 will be continued via the heating device 330 and preferably the (additional) heating device 332. The thawing is now completed more quickly, because a throughflow amount of the coolant liquid becomes higher because of a characteristic curve of the engine pump 140 and the temperature of the coolant liquid rises because of the waste heat of the internal combustion engine 100.

For an emergency start (emergency start mode N, cf. FIG. 2) no operating actions of a rail vehicle driver in a machine room are envisioned—for example opening faucets. In extraordinary situations it is necessary to start the internal combustion engine 100 immediately. These prerequisites will be fully fulfilled in the present case. During an emergency start the preheating device 310 switches off automatically and the starting of the internal combustion engine 100 takes place essentially immediately thereafter. The preheating circuit 30 will be automatically uncoupled via the non-return valves 340, 352 and the motorized valve 320 once again takes over the closed-loop control and/or open-loop control of the heating of the operating agent 302.

In accordance with the invention the modes B, V, N can be realized with just fluid-mechanical modules without an additional pump. In all modes B, V, N (operating cases) an overheating of the operating agent 302 and, with the preheating device 310 switched on, a freezing of the operating agent, in particular of a urea solution 302, will be suppressed. Furthermore, not only does the heating device 330 guarantee a thawing and heating, but the suction region 301 will preferably be heated with the (additional) heating device 332 especially connected in parallel or in series with the heating device 330.

In accordance with the invention there is an integration of the intermediate line 350 with the non-return valve 352. These elements connect the preheating circuit 32 or the preheating line 31 of the internal combustion engine 100 to the main heating circuit 30 for heating the operating agent 320. As a result of this arrangement, both during preheating (preheating mode V) and also when the internal combustion engine 100 is running (operating mode B) a heating of the operating agent 320 is made possible. This arrangement also makes it possible that, depending on an operating case, either the closed-loop control and/or open-loop control of the rail vehicle or of the internal combustion engine 100 or the closed-loop control and/or open-loop control of the temperature by the preheating device 310 suppresses a freezing or overheating of the operating agent 320. The transition from preheating mode V into the operating mode B when the internal combustion engine 100 is running can be carried out without any operating actions in the machine room or occurs automatically.

Furthermore, in accordance with the invention, there is an integration of the (additional) heating device 332 close to the floor, which is linked into a coolant liquid scheme. This enables the suction opening 372 for the operating agent 320 to be warmed up comparatively well and thawed if necessary. As a result of this arrangement it is insured that a liquid operating agent 320 is always present in the suction region 310 around the suction opening 372 of the suction connector 370. The liquid cushion lying at the bottom that is formed can normally not be sucked dry, because the vertical liquid column around the heating device 330 creates a fluid pressure downwards on the operating agent 320. A thawing process is encouraged by this, because the contact between frozen 320.2 and thawed operating agent 320.1 remains in place.

In accordance with the invention a complete heating of the reservoir 300 is obsolete, because the supply of liquid operating agent 302 is guaranteed in this way. The system does not need any additional electrical heating, since the preheating device 310 is preferably fuel-driven. Naturally the preheating device 310 can also be an electrical preheating device 310. A switch from preheating mode V into operating mode B and possibly in the reverse direction does not lead in each case to a switchover of a flow direction of the coolant liquid in a heating circuit of the reservoir 300. In the case of a pump 312 in the preheating device 310 that is too weak, a further pump can be connected-in in series before or after the preheating device 310.

Figure 5:
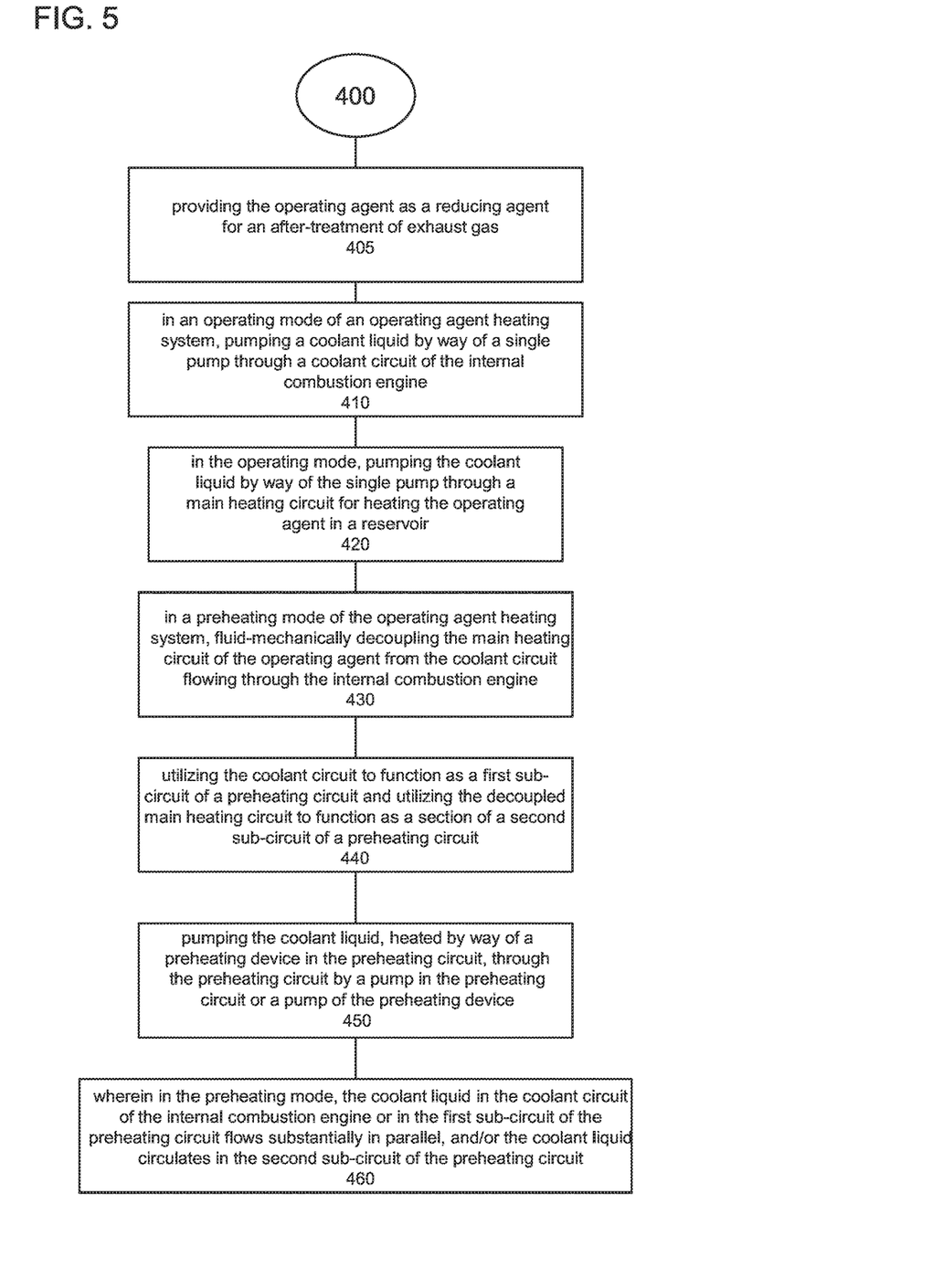
FIG. 5 is a flowchart showing the steps of a method of heating an operating agent for a rail vehicle having an internal combustion engine.

FIG. 5 is a flowchart showing the steps of a method 400 of heating an operating agent for a rail vehicle having an internal combustion engine. The method includes a step 405 of providing the operating agent as a reducing agent for an after-treatment of exhaust gas. The method includes a step 410 of in an operating mode of an operating agent heating system, pumping a coolant liquid by way of a single pump through a coolant circuit of the internal combustion engine. The method includes a step 420 of in the operating mode, pumping the coolant liquid by way of the single pump through a main heating circuit for heating the operating agent in a reservoir. The method includes a step 430 of in a preheating mode of the operating agent heating system, fluid-mechanically decoupling the main heating circuit of the operating agent from the coolant circuit flowing through the internal combustion engine. The method includes a step 440 of utilizing the coolant circuit to function as a first sub-circuit of a preheating circuit and utilizing the decoupled main heating circuit to function as a section of a second sub-circuit of a preheating circuit. The method includes a step 450 of pumping the coolant liquid, heated by way of a preheating device in the preheating circuit, through the preheating circuit by a pump in the preheating circuit or a pump of the preheating device. The method includes a step 460 of wherein in the preheating mode, the coolant liquid in the coolant circuit of the internal combustion engine or in the first sub-circuit of the preheating circuit flows substantially in parallel, and/or the coolant liquid circulates in the second sub-circuit of the preheating circuit.

The invention claimed is:

1. A method of heating an operating agent for a rail vehicle having an internal combustion engine, the method comprising:
    in an operating mode of an operating agent heating system, pumping a coolant liquid by way of a single pump through a coolant circuit of the internal combustion engine;
    in the operating mode, pumping the coolant liquid by way of the single pump through a main heating circuit for heating the operating agent in a reservoir;
    in a preheating mode of the operating agent heating system, fluid-mechanically decoupling the main heating circuit of the operating agent from the coolant circuit flowing through the internal combustion engine; and
    utilizing the coolant circuit to function as a first sub-circuit of a preheating circuit and utilizing the decoupled main heating circuit to function as a section of a second sub-circuit of a preheating circuit.

2. The method according to claim 1, wherein the operating agent is a reducing agent for an after-treatment of exhaust gas.

3. The method according to claim 1, which comprises pumping the coolant liquid, heated by way of a preheating device in the preheating circuit, through the preheating circuit by a pump in the preheating circuit or a pump of the preheating device.

4. The method according to claim 1, wherein, in the preheating mode, the coolant liquid in the coolant circuit of the internal combustion engine or in the first sub-circuit of the preheating circuit flows substantially in parallel, and/or the coolant liquid circulates in the second sub-circuit of the preheating circuit.

5. A reservoir heating system for a rail vehicle, the heating system comprising:
    a reservoir for an operating agent, said reservoir having a floor, having a suction opening for suctioning in the operating agent, and a heating device disposed in said reservoir for heating the operating agent;
    said heating device having two sections including a first section disposed perpendicular in relation to said floor of said reservoir and a second section disposed parallel to said floor of said reservoir;
    said two sections of said heating device, through which the coolant liquid flows, being fluidically connected in parallel.

6. The reservoir heating system according to claim 5, wherein the reservoir heating system includes at least one of the following two sets of limitations:
    1) said first section of said heating device extends up to or beyond a maximum fill level of the operating agent in said reservoir; and 2) said second section of said heating device is accommodated close to said floor in said reservoir.

7. The reservoir heating system according to claim 6, wherein said second section of said heating device is disposed to form a gap between said second section and said floor.

8. The reservoir heating system according to claim 5, wherein:
   the operating agent is a reducing agent for an after-treatment of exhaust gas;
   said suction opening is formed in a suction connector in said reservoir;
   said suction opening is formed in an area of said reservoir which adjoins both said sections of said heating device;
   said first section of said heating device has a shape of a rod or a cylinder;
   said second section of said heating device has a shape of a cushion or a cube;
   said two sections constitute a single heating device; or
   said two sections that are separate from one another constitute said heating device.

9. An operating agent heating system for a rail vehicle, the rail vehicle having an internal combustion engine and a coolant circuit, the heating system comprising:
   the coolant circuit for the internal combustion engine and a main heating circuit, for heating an operating agent in a reservoir, connected to the coolant circuit;
   wherein, in an operating mode of the operating agent heating system, a coolant liquid to be circulated through said main heating circuit is pumped by a single pump of the coolant circuit through said main heating circuit;
   said main heating circuit having an inflow line, and wherein, by bypassing said inflow line in a preheating mode of the operating agent heating system, said main heating circuit is bridged over by a heating element.

10. The operating agent heating system according to claim 9, wherein the operating agent is a reducing agent for an after-treatment of exhaust gas.

11. The operating agent heating system according to claim 9, wherein:
   said main heating circuit is connected to the coolant circuit by way of an inflow line downstream of said pump and by way of an outflow line upstream of the pump;
   said main heating circuit includes a valve configured to set a flow of coolant liquid through said main heating circuit on a basis of a temperature of the operating agent;
   said main heating circuit includes at least one heating device in the reservoir, and said at least one heating device is configured to heat or thaw a column and if necessary a cushion of the operating agent in close vicinity to a floor of the reservoir;
   a suction region of the operating agent in the reservoir or a suction opening may be heated or thawed by an additional heating device.

12. The operating agent heating system according to claim 9, wherein said preheating line has a first side connected to said main heating circuit and a second side connected to said coolant circuit.

13. The operating agent heating system according to claim 9, wherein first side of said preheating line is a connected to said main heating circuit downstream of said heating device and said second side is connected to said coolant circuit upstream of the cylinders.

14. The operating agent heating system according to claim 9, wherein:
   a preheating device is disposed on/in said preheating line downstream of said heating device and a non-return valve is disposed upstream of said preheating device;
   an intermediate line is connected to said preheating line downstream of said preheating device and upstream of said non-return valve, which is further connected to said main heating circuit; or
   the coolant circuit and said main heating circuit are convertible, by said preheating line and said intermediate line, into a preheating circuit, for preheating one or both of the internal combustion engine or the operating agent in said reservoir.

15. The operating agent heating system according to claim 9, wherein:
   said preheating circuit has two sub-circuits, including a first sub-circuit and a second sub-circuit, wherein in the preheating mode, the coolant liquid is conducted to flow through said two sub-circuits;
   said first sub-circuit being configured to conduct the coolant liquid to flow in parallel through said coolant circuit;
   said second sub-circuit being configured to fully circulate the coolant liquid; or
   in the preheating mode, the coolant liquid is pumped by said pump in said preheating line and/or said pump of said preheating device through said two sub-circuits.

16. The operating agent heating system according to claim 9, wherein the operating agent heating system is embodied such that, when there is a switch from the preheating mode into the operating mode and vice versa, no switch is effected in a direction of circulation through lines of said main heating circuit.

17. The operating agent heating system according to claim 14, wherein:
   said pump is an internal combustion engine-driven pump or an electrically-driven pump;
   said valve is a motorized valve;
   said valve is disposed upstream of said heating device in said main heating circuit;
   said preheating device is a fuel-driven device or an electrical preheating device;
   said non-return valve is disposed on or in said intermediate line upstream of said heating device;
   in the preheating mode, at least one of said internal combustion engine or said pump is inactive;
   a pump is disposed in said preheating line upstream or downstream of said preheating device;
   the operating agent heating system is configured to carry out the method according to claim 15; or
   the operating agent heating system includes a reservoir heating system with:
      a reservoir for the operating agent, said reservoir having a floor, having a suction opening for suctioning in the operating agent, and a heating device disposed in said reservoir for heating the operating agent;
      said heating device having two sections including a first section disposed perpendicular in relation to said floor of said reservoir and a second section disposed parallel to said floor of said reservoir;
      said two sections of said heating device, through which the coolant liquid flows, being fluidically connected in parallel.

18. The operating agent heating system according to claim 17, wherein said valve is disposed on or in said inflow line.

19. A rail vehicle or a motor vehicle, comprising:
a reservoir heating system having:
- a reservoir for an operating agent, said reservoir having a floor, having a suction opening for suctioning in the operating agent, and a heating device disposed in said reservoir for heating the operating agent;
- said heating device having two sections including a first section disposed perpendicular in relation to said floor of said reservoir and a second section disposed parallel to said floor of said reservoir;
- said two sections of said heating device, through which the coolant liquid flows, being fluidically connected in parallel;

an operating agent heating system having:
- a coolant circuit for an internal combustion engine and a main heating circuit, for heating an operating agent in a reservoir, connected to the coolant circuit;
- wherein, in an operating mode of the operating agent heating system, a coolant liquid to be circulated through said main heating circuit is pumped by a single pump of the coolant circuit through said main heating circuit;
- said main heating circuit having an inflow line, and wherein, by bypassing said inflow line in a preheating mode of the operating agent heating system, said main heating circuit is bridged over by way of a preheating line and a pump in the preheating line and/or a pump of a preheating device; and a control system for heating the operating agent by performing the following process steps:
- in an operating mode of an operating agent heating system, pumping a coolant liquid by way of a single pump through a coolant circuit of the internal combustion engine;
- in the operating mode, pumping the coolant liquid by way of the single pump through a main heating circuit for heating the operating agent in a reservoir;
- in a preheating mode of the operating agent heating system, fluid-mechanically decoupling the main heating circuit of the operating agent from the coolant circuit of the internal combustion engine; and
- utilizing the coolant circuit to function as a first sub-circuit of a preheating circuit and utilizing the decoupled main heating circuit to function as a section of a second sub-circuit of a preheating circuit.

* * * * *